Nov. 14, 1950          R. L. WRIGHT          2,530,188
LOAD READING VOLTMETER
Filed Dec. 7, 1946
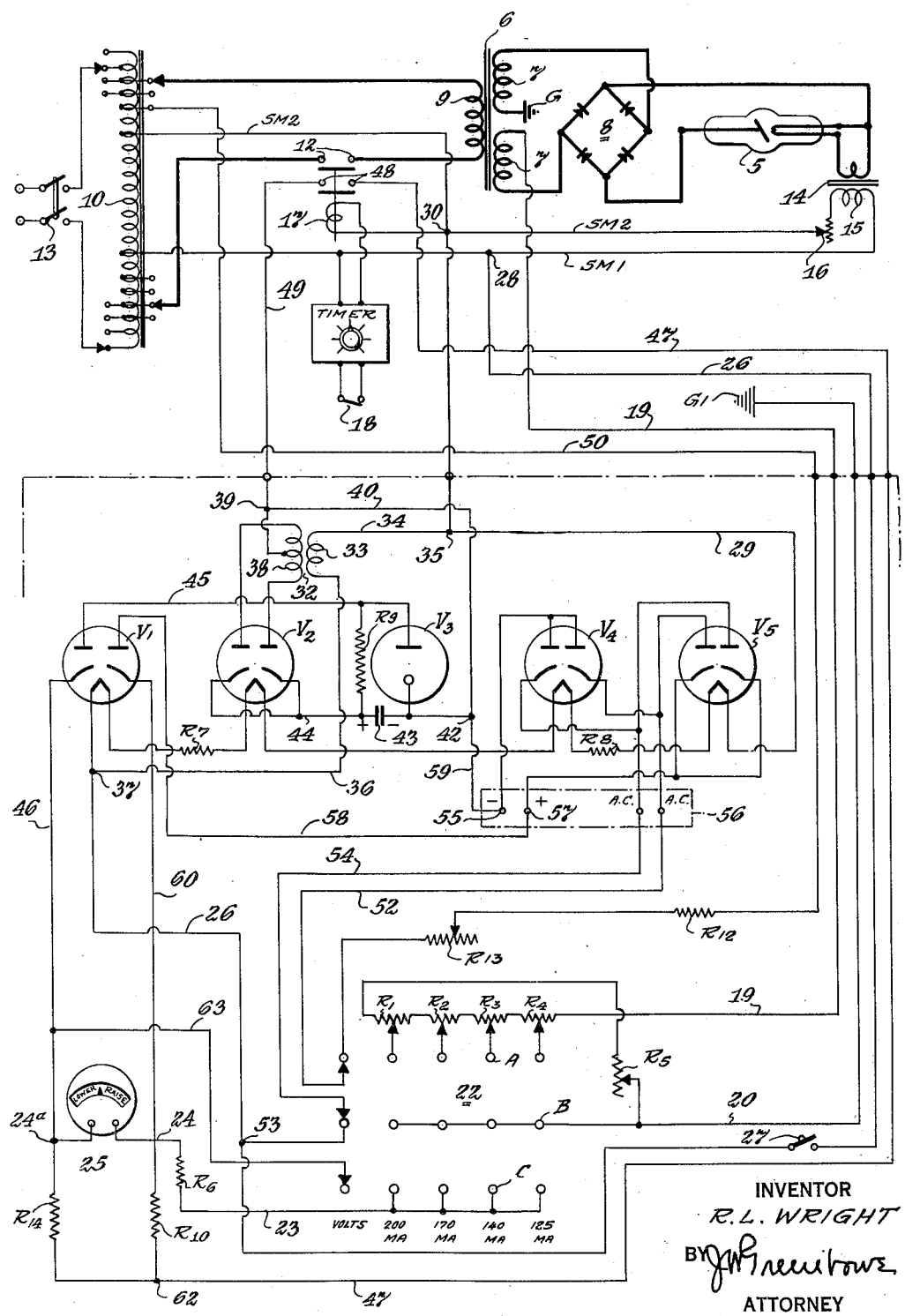
INVENTOR
R. L. WRIGHT
BY J. W. Greenhowe
ATTORNEY Patented Nov. 14, 1950

2,530,188

UNITED STATES PATENT OFFICE 2,530,188

LOAD READING VOLTMETER

Robert L. Wright, Severna Park, Md., assignor to Westinghouse Electric Corporation, East Pittsburgh, Pa., a corporation of Pennsylvania Application December 7, 1946, Serial No. 714,828

11 Claims. (Cl. 250—103)

The present invention relates to X-ray apparatus and especially to a system wherein the voltage and current supplied to the X-ray tube are accurately measured to assure correct and uniform exposures.

It has long been recognized in the art that, regardless of the presetting of the voltage or current for a given X-ray exposure, when the system is subjected to the loading of the X-ray tube the voltage drops appreciably as does the current, which is not conducive to consistent radiographic results. Various arrangements have been heretofore resorted to in an attempt to compensate for such drop in voltage and current, but at best they have not proven satisfactory because of variable conditions within the system itself. Accordingly, presetting of the voltage and current has actually been more or less arbitrary with no assurance to the average technician that his radiographic results for a given technique will be uniform.

It is accordingly the object of the present invention to provide an X-ray system wherein a meter is employed which indicates the precise voltage supplied to the X-ray tube during an exposure.

Another object of the present invention is the provision of an X-ray system wherein a meter is employed which is subjected to either a constant known voltage and an unknown voltage, or a constant known current and an unknown current, so as to selectively indicate the precise voltage or current supplied to the X-ray tube at a given moment.

Another object of the present invention is the provision of a metering arrangement for X-ray apparatus wherein the meter is subject to a constant voltage source and an unknown voltage source so as to indicate the precise voltage supplied to an X-ray tube during a given exposure.

Another object of the present invention is the provision of a metering arrangement for X-ray apparatus wherein the meter is subjected to a preselected definite current and to an unknown current value so as to indicate the precise current supplied at a given moment to an X-ray tube.

Still further objects of the present invention will become obvious to those skilled in the art by reference to the accompanying drawing wherein the single figure is a schematic illustration of an X-ray system employing a metering arrangement in accordance with the present invention.

Referring now to the drawing in detail, an X-ray tube 5 is shown which is energized from a high tension transformer 6 whose secondary winding 7 is connected through a full wave rectifying arrangement 8 to the X-ray tube. The primary winding 9 of the high tension transformer 6 in turn receives energy from the 230 volt taps of an auto-transformer 10 upon closure of a pair of normally open contacts 12, with the auto-transformer being energized from the customary commercial source of supply of about 220 volts upon closure of a main switch 13.

The thermionic cathode of the X-ray tube 5 receives heating energy from a low tension transformer 14, having its primary winding 15 connected to appropriate taps on the auto-transformer 10 of 110 to 125 volts by conductor SM1 and SM2. A rheostat 16 is included in the conductor SM2 for the purpose of regulating the current supplied to the thermionic cathode. The winding of a relay 17 has one of its ends also connected to the conductor SM2, while the remaining end of such winding is connected, through a "Timer" and "X-ray On" switch 18 to the other line conductor SM1, so that upon closure of the main switch 13 and "X-ray On" switch 18, relay 17 will be energized to close its normally open contacts 12 with attendant generation of X-rays for the period of time as preselected by the "Timer."

It will be noted that the secondary winding 7 of the high tension transformer 6 is grounded at the center G and is also connected by a conductor 19 to a series of preset resistors R1, R2, R3, R4, and a variable resistor R5 and thence by means of a conductor 20 back to ground at G1. Each of the resistors R1, R2, R3 and R4 is connected to a "current" tap of the upper deck A of a three deck switch, shown generally at 22, and the conductor 20 is similarly connected to taps of the center deck B of the switch 22. The lower deck C of the three deck switch 22 is provided also with current taps ranging from 125 milliamperes to 200 ma. and these taps are connected by a conductor 23 through a resistor R6 to a junction 24 and thence to one side of a direct current meter 25.

This meter 25 is subjected to a constant voltage source as well as an unknown voltage constituting the voltage of the auto-transformer 10 or the milliampere circuit during an exposure, in order to compare such voltages so as to regulate the voltage of the milliampere circuit to a precise preselected value during the exposure. For this purpose a "Comparator" tube V1 is provided which simultaneously passes both the known constant and the unknown voltages. The constant voltage is supplied from a supply source including a full wave rectifier tube V2 and a voltage regulator tube V3 while the unknown voltage is supplied from a source including a pair of rectifiers V4 and V5 and forming a full-wave bridge arrangement.

The thermionic heaters of each of the tubes V1, V2, V4 and V5 are connected in series with each other and to 110–125 volt taps on the auto-transformer 10 by a conductor 26 extending from the filament of tube V1 through a switch 27 to a junction 28 in conductor SM1, and by a conductor 29 extending from the filament of tube V5 to a junction 30 in conductor SM2. Resistors R7 and R8 are included in the series circuit with the filaments for these tubes, to drop the voltage slightly below that supplied from the auto-transformer taps to which the SM1 and SM2 conductors are connected. The constant voltage for meter 25 is supplied by a transformer 32 whose primary winding 33 is connected to the 110–125 volt supply source by a conductor 34 connected to a junction 35 in conductor 29 (and hence to the SM2 conductor) and by another conductor 36 connected to a junction 37 in conductor 26 (and hence to the SM1 conductor). The secondary winding 38 of transformer 32 has its ends connected to the respective anodes of rectifier tube V2 while the mid-point of this secondary winding is connected to a junction 39 from which a conductor 40 extends to another junction 42 and thence to the cathode of voltage regulator tube V3 and to the negative plate of a capacitor 43 while the positive plate of this capacitor is connected by a conductor 44 to each of the cathodes of rectifier tube V2. Such capacitor is accordingly charged during each half-wave of the alternating current cycle from transformer secondary 38 through full wave rectifying tube V2.

Upon the charging of capacitor 43 it supplies a voltage across the anode and cathode of voltage regulator tube V3 through a resistor R9 which voltage is maintained at a constant precise value by the action of this tube V3. Such constant voltage is also impressed across "comparator" tube V1 and meter 25 through a circuit extending from one end of resistor R9 and anode of tube V3, and by means of a conductor 45, to one of the anodes of tube V1. From one of the cathodes of this latter tube a conductor 46 extends to a junction 24A and to one side of meter 25 as well as thru resistor 14 to conductor 47 and from the other side of the meter to junction 24, thence through a resistor R10, and by a conductor 47 to one of a pair of relay contacts 48 of relay 17. The remaining contact of this pair 48 is connected by a conductor 49 to the junction 39 and hence by conductor 40 to the negative side of capacitor 43. Thus capacitor 43 discharges at a constant voltage through "comparator" tube V1 and meter 25 and in the absence of provisions to the contrary would cause a deflection of the meter pointer.

The unknown voltage previously mentioned is supplied from a voltage tap of approximately 148 volts from auto-transformer 10 through a conductor 50, a fixed resistor R12 and a variable resistor R13, to the voltage tap of the upper deck A of switch 22, and from the movable arm for the upper deck A through a conductor 52 to one of the cathodes of rectifier tube V4 and one of the anodes of rectifier tube V5. The remaining side of the voltage supply extends from a junction 53 on conductor 26 (and hence from conductor SM1) to the movable arm in engagement with the voltage tap of the center deck B of switch 22 and thence by a conductor 54 to the remaining cathode of tube V4 and remaining anode of tube V5. The unidirectional output from the bridge arrangement extends from the anodes of tube V4 to a negative terminal 55 on a block 56 and from the cathodes of tube V5 to the positive terminal 57 on the block 56.

From the positive terminal 57 a conductor 58 extends to the remaining anode of comparator tube V1 and a conductor 59 extends from the negative terminal 55 to the junction 42 in conductor 40. The meter 25 is accordingly supplied with this "unknown" voltage through a circuit which extends from the positive terminal 57 through conductor 58 to the anode of tube V1 and thence from the remaining cathode of the latter through a conductor 60 to the junction 24 and to meter 25 (although a small amount of current also flows through the resistor R10). Thence from meter 25 through a resistor R14 of substantially the same resistance as resistor R10, to a junction 62 in conductor 47 and by means of the latter to contacts 48 of relay 17, conductor 49 to junction 39, thence through conductor 40, junction 42 and conductor 59 to negative terminal 55.

The system thus far described operates in the following manner: the operator first closes the main line switch 13 which thus energizes the auto-transformer 10 as well as low tension transformer 14 with attendant heating of the thermionic cathode of X-ray tube 5. Switch 27 is next closed completing the heating circuit from the auto-transformer 10 through conductor SM1, junction 28, conductor 26 and switch 27 (now closed), junctions 53 and 37 to the filament of tube V1, thence through resistor R7, filaments of tubes V2 and V4, resistor R8, filament of tube V5 and thence by conductor 29, junctions 35 and 30, and conductor SM2 to another tap on auto-transformer 10. At the same time closure of switch 27 also energizes the primary winding 33 of transformer 32 since it is connected by conductors 34 and 36 to the respective junctions 35 and 37 and hence to supply conductors SM1 and SM2 as previously traced relative to the filaments for tubes V1, V2, V4 and V5.

The entire apparatus at this time is ready for a trial exposure (without a film in position) so the operator sets the "Timer" for the period desired for the exposure and closes the "X-ray On" switch 18. Relay 17 is immediately energized, being connected to conductors SM1 and SM2 by closure of switch 18, and such relay closes its contacts 12 and 48. Closure of contacts 12 energizes high tension transformer 6 with the supply of a high potential energy to the X-ray tube 5 and the attendant generation of X-rays for a period of time as preset by the "Timer." The simultaneous closure of contacts 48 completes a circuit from condenser 43 through resistor R9 and conductor 45 to one of the anodes of tube V1, and from one of the cathodes of this tube, through conductor 46, resistor R14, and conductors 47, 49 and 40, to condenser 43.

Upon charging of condenser 43, which takes place as long as switch 27 is closed, it discharges through resistor R9 across voltage regulator tube V3 with this same constant discharge voltage being supplied meter 25 through the circuit including one anode and cathode of comparator tube V1 as previously traced. At the time the bridge rectifying arrangement comprising the tubes V4 and V5 is supplied with energy from the conductors SM1 and SM2 at about 148 volts which impresses the unidirectional current across the meter 25 and remaining anode and cathode of comparator tube V1 through the circuit above traced for the "unknown" voltage. Accordingly, the characteristics of the circuits for the known constant and unknown voltages are substantially the same because of the equal resistance of resistors R10 and R14 and if for any reason the "unknown" voltage is lower than the known constant voltage the meter 25 will deflect to the right indicating the "unknown" voltage should be raised or, conversely, if the "unknown" voltage is higher than the known constant voltage, the meter 25 deflects to the left to indicate the "unknown" voltage should be lowered.

The operator then adjusts the auto-transformer voltage by switch 10A until the meter 25 maintains a central or neutral position which assures that the two voltages are equal. Of course, during the interim required to observe the meter deflection and to adjust the resistor R13, the "Timer" will have operated to de-energize the system which accordingly may necessitate several trial exposures of the X-ray tube in order to equalize the voltages. However, once equalized for a given kilovoltage applied to the X-ray tube 5, the operator then places the patient or object as well as a photographic film in position for a radiographic exposure and closes the "X-ray On" switch 18 to complete the exposure with the assurance that the voltage actually supplied the X-ray tube will be not only constant but that precisely necessary to produce the best radiographic results.

In the event the operator desires to check the milliamperage supplied to the X-ray tube and maintain the same at a constant value, the three deck switch 22 is moved from the voltage position toward the right to one of the milliampere settings shown adjacent the contacts on the lower deck C. Assuming, for example, the switch 22 is set on the 200 ma. contacts, the comparator tube V1 and meter 25 operates in the same manner as previously described. However, instead of the "unknown" voltage being supplied directly from the auto-transformer 10, as in the volts position of switch 22, in the milliampere position of the latter, the voltage supplied to the bridge arrangement comprising tubes V4 and V5 is the voltage drop across the resistors R1 and R5 when in the 200 ma. position of switch 22. This follows from the fact that all resistors R1 to R5 inclusive are in series with the secondary winding 7 of high voltage transformer 6, hence carrying the same milliamperage supplied to the X-ray tube 5. There is accordingly a voltage drop across each resistor and at 200 ma. the resistance of R1 and R5 is sufficient to produce a given voltage for the bridge arrangement but, since the lower the milliamperage the more resistance required to build up a sufficient voltage, at 125 ma. setting of switch 22 all resistors R1 to R5 are necessary.

Accordingly, to assure a desired milliamperage setting for X-ray tube 5 the operator first moves the three deck switch 22 to such corresponding milliamperage. He then makes several trial exposures noting the deflection of meter 25. If the milliamperage is below the preselected value the meter 25 deflects to the left, or if too high it will deflect to the right. The operator then adjusts resistor 16 to raise or lower the resistance of the latter, which causes a change in the temperature of the X-ray tube filament and hence a change in milliamperage through the X-ray tube. This again conditions the apparatus for another actual radiographic exposure upon placing of the patient or object and the sensitized film in position with assurance that the X-ray tube will be energized at the precise milliamperage desired for the indicated technique at the moment. It will also be noted that in each milliamperage position of switch 22, the lower deck C connects resistor R6 in shunt across the meter 25 through conductor 23 and a conductor 63, for the purpose of making the meter 25 less sensitive and easier to read, since it would be otherwise affected by the changing value of milliamperage during an exposure, due to the fact that the latter decreases with the time of exposure, being slightly higher at the beginning than at the end of the exposure.

From the foregoing it should become obvious to those skilled in the art that an X-ray system is herein shown and described wherein a meter is provided which is simultaneously subjected to a known constant voltage and to an "unknown" voltage having a direct relationship with the voltage and current of the high voltage energizing circuit for the X-ray tube. Should the voltages of these two sources differ the meter deflects to indicate such unbalanced condition and the operator then adjusts the unknown voltage so as to equalize the same with the known constant voltage which is indicated by no deflection of the meter. When properly adjusted either for a desired voltage or current the operator is assumed that the X-ray tube will be energized by a preselected voltage and current for best radiographic results for the particular technique at the moment desired.

Although one specific embodiment of the present invention is shown and described, it is to be understood that still further modifications thereof may be made without departing from the spirit and scope of the appended claims.

I claim:

1. An X-ray system comprising an X-ray tube energizable with unidirectional current from a high tension transformer and having its primary winding connected to a source of variable voltage, means connected to said variable voltage source for producing a known constant voltage, additional means connected to said variable voltage source for producing an unknown voltage having a direct relation to the voltage supplied by said variable voltage source to the primary winding of said high tension transformer, a meter connected to both said means and said additional means and simultaneously subjected to the known constant and the unknown voltages and operable to deflect to indicate when the unknown voltage is higher or lower than the known constant voltage, and adjustable means connected to said additional means and operable to adjust the unknown voltage until no deflection of said meter occurs, to indicate equalization of both voltages supplied to said meter and that a definite desired voltage is supplied by said high tension transformer to said X-ray tube.

2. An X-ray system comprising an X-ray tube energizable with unidirectional current from a high tension transformer and having its primary winding connected to a source of variable voltage, means connected to said variable voltage source for producing a known constant direct current voltage, additional means connected to said variable voltage source for producing an unknown direct-current voltage having a direct relation to the voltage supplied by said variable voltage source to the primary winding of said high tension transformer, a direct current meter connected to both said means and said additional means and simultaneously subjected to the known constant and the unknown voltages and operable to deflect to indicate when the unknown voltage is higher or lower than the known constant voltage, and adjustable means connected to said additional means and operable to adjust the unknown voltage until no deflection of said meter occurs, to indicate equalization of both voltages supplied to said meter and that a definite desired voltage is supplied by said high tension transformer to said X-ray tube.

3. An X-ray system comprising an X-ray tube energizable with unidirectional current from a high tension transformer and having its primary winding connected to a source of variable voltage, means connected to said variable voltage source for producing a known constant direct current voltage, additional means connected to said variable voltage source for producing an unknown direct-current voltage having a direct relation to the voltage supplied by said variable voltage source to the primary winding of said high tension transformer, a comparator tube connected to and operable to pass current from both said means and said additional means, a direct current meter connected to both said means through said comparator tube and simultaneously subjected to the known constant and the unknown voltages and operable to deflect to indicate when the unknown voltage is higher or lower than the known constant voltage, and adjustable means connected to said additional means and operable to adjust the unknown voltage until no deflection of said meter occurs, to indicate equalization of both voltages, supplied to said meter and that a definite desired voltage is supplied by said high tension transformer to said X-ray tube.

4. An X-ray system comprising an X-ray tube energizable with unidirectional current from a high tension transformer and having its primary winding connected to a source of variable voltage, means connected to said variable voltage source including a voltage regulator tube for producing a known constant direct current voltage, additional means connected to said variable voltage source including a full-wave rectifying bridge arrangement for producing an unknown direct-current voltage having a direct relation to the voltage supplied by said variable voltage source to the primary winding of said high tension transformer, a direct current meter connected to both said means and said additional means and simultaneously subjected to the known constant and the unknown voltages and operable to deflect to indicate when the unknown voltage is higher or lower than the known constant voltage, and adjustable means connected to said additional means and operable to adjust the unknown voltage until no deflection of said meter occurs, to indicate equalization of both voltages supplied to said meter and that a definite desired voltage is supplied by said high tension transformer to said X-ray tube.

5. An X-ray system comprising an X-ray tube energizable with unidirectional current from a high tension transformer and having its primary winding connected to a source of variable voltage, means connected to said variable voltage source including a voltage regulator tube for producing a known constant direct current voltage, additional means connected to said variable voltage source including a full-wave rectifying bridge arrangement for producing an unknown direct-current voltage having a direct relation to the voltage supplied by said variable voltage source to the primary winding of said high tension transformer, a comparator tube connected to and operable to pass current from both said means and said additional means, a direct current meter connected to both said means and said additional means through said comparator tube and simultaneously subjected to the known constant and the unknown voltages and operable to deflect to indicate when the unknown voltage is higher or lower than the known constant voltage, and adjustable means connected to said additional means and operable to adjust the unknown voltage until no deflection of said meter occurs, to indicate equalization of both voltages supplied to said meter and that a definite desired voltage is supplied by said high tension transformer to said X-ray tube.

6. An X-ray system comprising an X-ray tube energizable with unidirectional current from a high tension transformer having its primary winding connected to a source of variable voltage and its secondary winding connected in series with a resistor, means connected to said variable voltage source for producing a known constant direct current voltage, additional means adapted to produce an unknown direct-current voltage, switching means operable to connect said additional means to said variable voltage source so that the direct-current produced by said additional means has a direct relation to the voltage supplied to the primary winding of said high tension transformer or said switching means being operable to connect said additional means across the resistor in series with the secondary winding of said high tension transformer so that the voltage produced by said additional means is in direct relation to the milliamperage supplied to said X-ray tube, a direct current meter connected to both said means and said additional means and simultaneously subjected to the known constant and the unknown voltages and operable to deflect to indicate when the unknown voltage is higher or lower than the known constant voltage, and adjustable means connected to said additional means and operable to adjust the unknown voltage until no deflection of said meter occurs, to indicate equalization of both voltages supplied to said meter and that a definite desired voltage is supplied by said high tension transformer to said X-ray tube.

7. An X-ray system comprising an X-ray tube energizable with unidirectional current from a high tension transformer having its primary winding connected to a source of variable voltage and its secondary winding connected in series with a resistor, means connected to said variable voltage source including a voltage regulator tube for producing a known constant direct current voltage, additional means including a full-wave rectifying bridge arrangement adapted to produce an unknown direct-current voltage, switching means operable to connect said additional means to said variable voltage source so that the direct-current produced by said additional means has a direct relation to the voltage supplied to the primary winding of said high tension transformer or said switching means being operable to connect said additional means across the resistor in series with the secondary winding of said high tension transformer so that the voltage produced by said additional means is in direct relation to the milliamperage supplied to said X-ray tube, a direct current meter connected to both said means and said additional means and simultaneously subjected to the known constant and the unknown voltages and operable to deflect to indicate when the unknown voltage is higher or lower than the known constant voltage, and adjustable means connected to said additional means and operable to adjust the unknown voltage until no deflection of said meter occurs, to indicate equalization of both voltages supplied to said meter and that a definite desired voltage is supplied by said high tension transformer to said X-ray tube.

8. An X-ray system comprising an X-ray tube energizable with unidirectional current from a high tension transformer and having its primary winding connected to a source of variable voltage and its secondary winding connected in series with a resistor, means connected to said variable voltage source including a voltage regulator tube for producing a known constant direct current voltage, additional means including a full-wave rectifying bridge arrangement adapted to produce an unknown direct current voltage, switching means operable to connect said additional means to said variable voltage source so that the direct current produced by said additional means has a direct relation to the voltage supplied to the primary winding of said high tension transformer or said switching means being operable to connect said additional means across the resistor in series with the secondary winding of said high tension transformer so that the voltage produced by said additional means is in direct relation to the milliamperage supplied to said X-ray tube, a comparator tube operable to pass current from both said means, a direct current meter connected to both said means through said comparator tube and simultaneously subjected to the known constant and the unknown voltages and operable to deflect to indicate when the unknown voltage is higher or lower than the known constant voltage, and means associated with said additional means and operable to adjust the unknown voltage until no deflection of said meter occurs, to indicate equalization of both voltages supplied to said meter and that a definite desired voltage is supplied by said high tension transformer to said X-ray tube.

9. An X-ray system comprising an X-ray tube energizable with unidirectional current from a high tension transformer having its primary winding connected to a source of variable voltage and its secondary winding connected in series with a resistor, a transformer having its primary connected to said variable voltage source and its secondary connected through a rectifier tube to a capacitor for producing a known constant direct current voltage, means connected to said variable voltage source adapted to produce an unknown direct-current voltage, switching means operable to connect said unknown voltage producing means to said variable voltage source so that the direct-current produced by said unknown voltage producing means has a direct relation to the voltage supplied to the primary winding of said high tension transformer or said switching means being operable to connect said unknown voltage producing means across the resistor in series with the secondary winding of said high tension transformer so that the voltage produced by said unknown voltage producing means is in direct relation to the milliamperage supplied to said X-ray tube, a direct current meter connected to both said capacitor and said unknown voltage producing means and simultaneously subjected to the known constant and the unknown voltages and operable to deflect to indicate when the unknown voltage is higher or lower than the known constant voltage, and means associated with said unknown voltage producing means and operable to adjust the unknown voltage until no deflection of said meter occurs, to indicate equalization of both voltages supplied to said meter and that a definite desired voltage is supplied by said high tension transformer to said X-ray tube.

10. An X-ray system comprising an X-ray tube energizable with unidirectional current from a high tension transformer having its primary winding connected to a source of variable voltage and its secondary winding connected in series with a resistor, a transformer having its primary connected to said variable voltage source and its secondary connected through a rectifier tube to a capacitor and a voltage regulator tube for producing a known constant direct current voltage, a full-wave rectifying bridge arrangement adapted to produce an unknown direct-current voltage, a switch operable to connect said bridge arrangement to said variable voltage source so that the direct-current produced by said bridge arrangement has a direct relation to the voltage supplied to the primary winding of said high tension transformer or said switch being operable to connect said bridge arrangement across the resistor in series with the secondary winding of said high tension transformer so that the voltage produced by said bridge arrangement is in direct relation to the milliamperage supplied to said X-ray tube, a direct current meter connected in electrical circuit with both said capacitor and bridge arrangement and simultaneously subjected to the known constant and the unknown voltages and operable to deflect to indicate when the unknown voltage is higher or lower than the known constant voltage, and adjustable means connected to said bridge arrangement and operable to adjust the unknown voltage until no deflection of said meter occurs, to indicate equalization of both voltages supplied to said meter and that a definite desired voltage is supplied by said high tension transformer to said X-ray tube.

11. An X-ray system comprising an X-ray tube energizable with unidirectional current from a high tension transformer and having its primary winding connected to a source of variable voltage and its secondary winding connected in series with a resistor, a transformer having its primary connected to said variable voltage source and its secondary connected through a rectifier tube to a capacitor and a voltage regulator tube for producing a known constant direct current voltage, a full-wave rectifying bridge arrangement adapted to produce an unknown direct-current voltage, a switch operable to connect said bridge arrangement to said variable voltage source so that the direct-current produced by said bridge arrangement has a direct relation to the voltage supplied to the primary winding of said high tension transformer or said switch being operable to connect said bridge arrangement across the resistor in series with the secondary winding of said high tension transformer so that the voltage produced by said bridge arrangement is in direct relation to the milliamperage supplied to said X-ray tube, a comparator tube operable to pass current from both said capacitor and bridge arrangement, a direct current meter connected to both said capacitor and bridge arrangement through said comparator tube and simultaneously subjected to the known constant and the unknown voltages and operable to deflect to indicate when the unknown voltage is higher or lower than the known constant voltage, and a variable resistor connected to said bridge arrangement and operable to adjust the unknown voltage until no deflection of said meter occurs, to indicate equalization of both voltages supplied to said meter and that a definite desired voltage is supplied by said high tension transformer to said X-ray tube.

ROBERT L. WRIGHT.

REFERENCES CITED

The following references are of record in the file of this patent:

UNITED STATES PATENTS

| Number | Name | Date |
|---|---|---|
| 1,917,417 | Zuschlag | July 11, 1933 |
| 1,961,703 | Morrison | June 5, 1934 |
| 2,151,602 | Kearsley | Mar. 21, 1939 |
| 2,167,802 | Goldfield | Aug. 1, 1939 |
| 2,222,451 | Trost | Nov. 19, 1940 |

OTHER REFERENCES

X-ray Inspection With Phosphors and Photoelectric Tubes, by H. M. Smith—G. E. Review—Mar. 1945, pp. 13–17.